United States Patent
Lin et al.

(10) Patent No.: US 11,134,142 B2
(45) Date of Patent: Sep. 28, 2021

(54) SIMPLIFIED USER INTERFACE FOR IDENTIFYING PEOPLE WHEN MAKING ELECTRONIC COMMUNICATIONS

(71) Applicant: Avaya Inc., Santa Clara, CA (US)

(72) Inventors: Lin Lin, Tottenham (CA); Ping Lin, Tottenham (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/148,534

(22) Filed: Oct. 1, 2018

(65) Prior Publication Data

US 2020/0106871 A1    Apr. 2, 2020

(51) Int. Cl.
| | |
|---|---|
| *H04W 4/14* | (2009.01) |
| *H04M 1/27457* | (2020.01) |
| *G06F 16/335* | (2019.01) |
| *H04M 1/2746* | (2020.01) |

(52) U.S. Cl.
CPC ...... *H04M 1/27457* (2020.01); *G06F 16/335* (2019.01); *H04M 1/2746* (2020.01); *H04W 4/14* (2013.01)

(58) Field of Classification Search
CPC ...... H04M 1/274533; H04M 1/274583; G06F 16/335; G06F 17/2775; H04W 4/14
See application file for complete search history.

(56) References Cited

U.S. PATENT DOCUMENTS

| | | | | |
|---|---|---|---|---|
| 2005/0243979 | A1* | 11/2005 | Starbuck | H04M 1/72552 379/88.19 |
| 2008/0075244 | A1* | 3/2008 | Hale | H04M 3/42221 379/88.13 |
| 2012/0084291 | A1* | 4/2012 | Chung | G06F 16/14 707/741 |
| 2012/0191730 | A1* | 7/2012 | Parikh | G06Q 30/0201 707/754 |
| 2012/0304078 | A1* | 11/2012 | Ramaswamy | H04M 3/382 715/753 |

(Continued)

OTHER PUBLICATIONS

"FOAF Vocabulary Specification 0.99," Dan Brickley and Libby Miller, 2014, 43 pages [retrieved online from: xmlns.com/foaf/spec/].

(Continued)

*Primary Examiner* — Barry W Taylor
(74) *Attorney, Agent, or Firm* — Sheridan Ross P.C.

(57) ABSTRACT

A request to identify a person is received from a user. For example the user may say "Find me the name of a person who sent me an email regarding Project X last week." The request is to identify the person in order to establish an electronic communication session with the identified person. The request is parsed to identify one or more filtering criteria. One or more electronic record stores are determined based on the one or more filtering criteria. For example, specific devices on a network are identified. The one or more electronic record stores are searched using the one or more filtering criteria to create a filtered list of persons. The filtered list of persons is displayed on a first communication device in a simplified user interface. The simplified user interface dramatically reduces the time and steps necessary to identify the person and establish the communication session.

20 Claims, 5 Drawing Sheets

(56) References Cited

U.S. PATENT DOCUMENTS

| | | | | |
|---|---|---|---|---|
| 2012/0331418 | A1* | 12/2012 | Bonforte | G06F 3/0481 |
| | | | | 715/784 |
| 2015/0310188 | A1* | 10/2015 | Ford | H04L 63/0428 |
| | | | | 726/28 |
| 2016/0179938 | A1* | 6/2016 | Ghafourifar | H04L 51/16 |
| | | | | 707/609 |
| 2016/0205057 | A1* | 7/2016 | Wang | G06Q 10/10 |
| | | | | 709/206 |
| 2017/0103132 | A1* | 4/2017 | Wall | G06F 16/24578 |
| 2017/0169351 | A1* | 6/2017 | Guo | G06N 7/005 |
| 2018/0089602 | A1* | 3/2018 | Elvira | G06Q 10/0633 |
| 2019/0237095 | A1* | 8/2019 | Duguid | G06Q 30/0282 |
| 2019/0364003 | A1* | 11/2019 | Sachdeva | H04L 51/18 |

OTHER PUBLICATIONS

"Friend of a friend (FOAF) search engine," netEstate GmbH, 2018, 2 pages [retrieved online from: www.foaf-search.net/].

"Soundex System the Soundex Indexing System," The U.S. National Archives and Records Administration, updated May 30, 2007, 3 pages [retrieved online from: www.archives.gov/research/census/soundex.html].

Rosenberg et al. "SIP: Session Initiation Protocol," Network Working Group, Ju. 2002, RFC 3261, 269 pages.

* cited by examiner

SIMPLIFIED USER INTERFACE FOR IDENTIFYING PEOPLE WHEN MAKING ELECTRONIC COMMUNICATIONS

FIELD

The disclosure relates generally to electronic communications and particularly to identifying a particular user in order to make the electronic communications.

BACKGROUND

When a user attempts to establish a communication session with another person (e.g., a voice call using a smartphone), using today's user interfaces, it is often difficult and laborious to identify the other person if the other person's name cannot be remembered. The user must scroll through long lists of names and navigate between multiple screens in order to identify the person. This is particularly difficult on a hand-held mobile device, such as a smartphone. Because the screen of a smartphone is small, the volume of information and number of screens necessary to find the right person makes this task even more difficult.

SUMMARY

These and other needs are addressed by the various embodiments and configurations of the present disclosure. A request to identify a person is received from a user. For example, the user may say "Find me the name of a person who sent me an email regarding Project X last week." The request is to identify the person in order to establish an electronic communication session with the identified person. The request is parsed to identify one or more filtering criteria. One or more electronic record stores are determined based on the one or more filtering criteria. For example, specific devices on a network are identified. The one or more electronic record stores are searched using the one or more filtering criteria to create a filtered list of persons. The filtered list of persons is displayed on a first communication device in a simplified user interface. The simplified user interface dramatically reduces the time and steps necessary to identify the person and establish the communication session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "electronic record store" can be or may include hardware device that can store electronic information, such as a computer memory, a hard disk, a server, a flash drive, a flash memory, a backup server, a smartphone, a scanner, a printer, a web server, a social media network, and/or the like. The data on the electronic record store may comprise a database, a file, a memory block, a document, a bitmask-able memory element, an electronic list, a Simple Network Management Protocol (SNMP) Management Information Base (MIB), an email database, a virtual reality system (e.g., a gaming system), a contact center database, a Private Branch Exchange (PBX) communication database, a conference server database, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
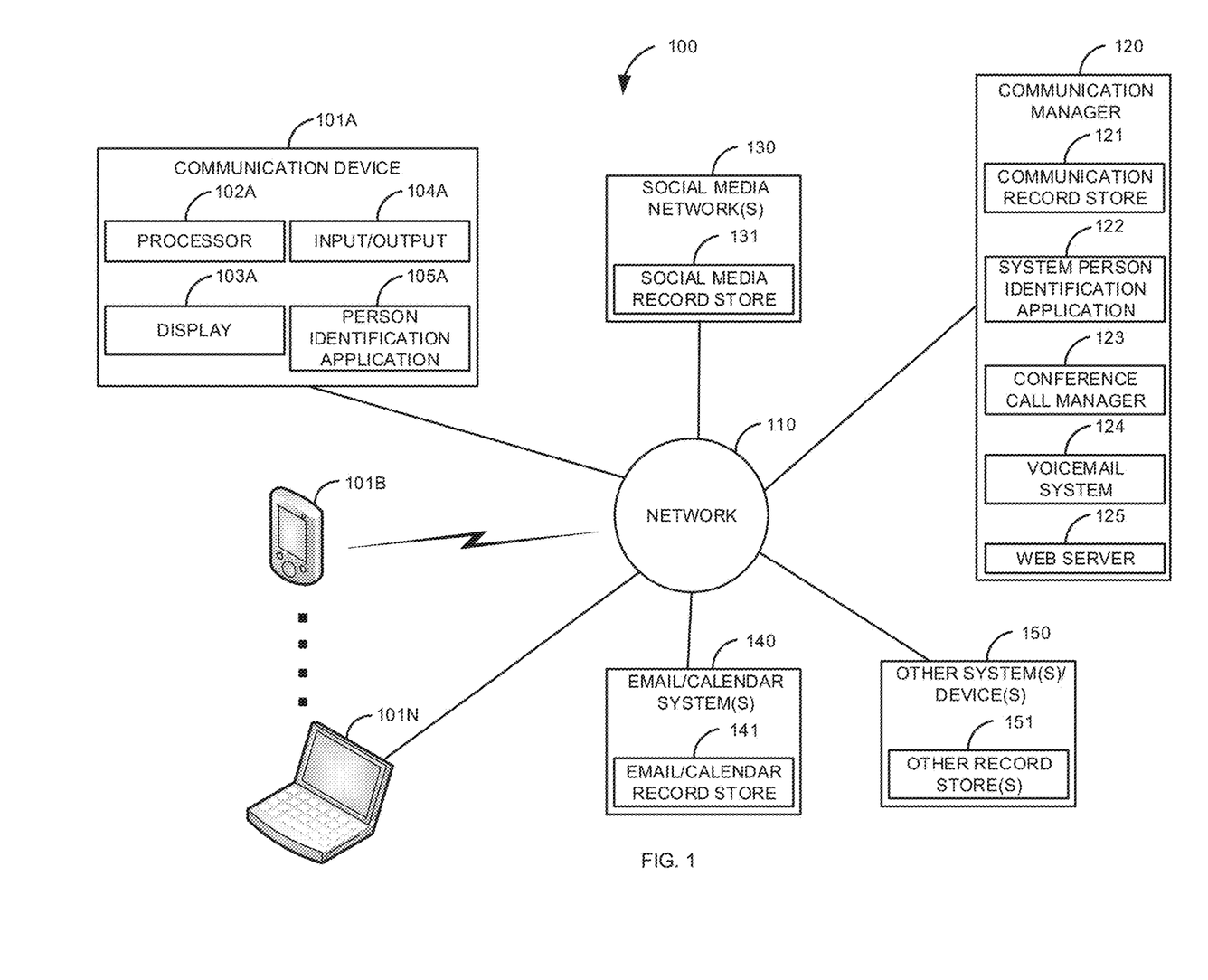
FIG. 1 is a block diagram of a first illustrative system for a simplified user interface for identifying people when making electronic communications.

FIG. 1 is a block diagram of a first illustrative system 100 for a simplified user interface for identifying people when making electronic communications. The first illustrative system 100 comprises communication devices 101A-101N, a network 110, a communication manager 120, social media network(s) 130, email/calendar system(s) 140, and other system(s)/device(s) 150.

The communication device 101A can be or may include any user device that can communicate on the network 110, such as a Personal Computer (PC), a telephone, a video system, a cellular telephone, a Personal Digital Assistant (PDA), a tablet device, a notebook device, a smart phone, a laptop computer, a conferencing system, a gaming system, a virtual reality headset, a smart watch, and/or the like. As shown in FIG. 1, any number of communication devices 101A-101N may be connected to the network 110, including only a single communication device 101.

The communication device 101A further comprises a processor 102A, a display 103A, input/output 104A, and a person identification application 105A. The processor 102A can be or may include any hardware processor, such as a microprocessor, a multi-core processor, an application specific processor, a micro-controller, and/or the like.

The display 103A can be or may include any hardware device that can display information to a user, such as a touch screen, a Light Emitting Diode (LED) display, a plasma display, a liquid crystal display, a lamp, a cathode ray tube, a LED, and/or the like. The input/output 104A can be or may include any hardware device that can convey information to and from a user, such as a touch screen, a mouse, a trackball, a speaker, a microphone, a vibrator, an accelerometer, a sensor, a camera, and/or the like.

The person identification application 105A can be or may include any software coupled with hardware that provides information about users. The person identification application 105A allows the user to identify a person where the user has forgotten the person's name. The person identification application 105A typically works in conjunction with a system person identification application 122. However, in one embodiment, the person identification application 105A may work as a stand-alone application.

The communication devices 101B-101N are not shown to comprise the processor 102, the display 103, the input/output 104, and the person identification application 105 for simplicity. However, the communication devices 101B-101N can comprise all or a subset of the elements 102-105.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, Instant Messaging (IM) protocols, text messaging protocols, and/or the like. Thus, the network 110 is an electronic communication network configured to carry messages via packets and/or circuit switched communications.

The communication manager 120 can be or may include any hardware coupled with software that can manage and route communications, such as a Private Branch Exchange (PBX), a central office switch, a proxy server, a router, and/or the like. The communication manager 120 can manage and route various types of communications, such as voice communications, video communications, Instant messaging communications, virtual reality communications, email communications, social media communications, text messaging communications, and/or the like. The communication manager 120 further comprises a communication record store 121, a system person identification application 122, a conference manager 123, a voicemail system 124, and a web server 125.

The communication record store 121 can be or may include any record store that provides a record of communications managed by the communication manger 120 (and/ or other devices). For example, the communication record store 121 may contain call dates/time of communication sessions (e.g., voice/video), a call length, a recording of a call/IM session (e.g., stored in text), a roster of participants in a conference call, an Radio Frequency Identifier (RFID) of participants in a conference room that was part of the conference call, a more active talker in the conference call, a less active talker in the conference call, a date of the conference call, a time of the conference call, a subject discussed in the conference call (e.g., from a voice to text transcript), and a location of a participant in the conference call, a date of a voicemail, a time of the voicemail, a subject of the voicemail, an organization of a person who left the voicemail message, a location of the person who left the voicemail message, and/or the like. In one embodiment, the communication record store 121 may be on the communication device 101 and/or distributed between the communication device 101 and the communication manger 120.

The system person identification application 122 can be or may include any hardware coupled with software that can assist the person identification application 105 to identify a person. The system person identification application 122 can search any number of places to help identify a person, such as the communication record store 121, the social media record store 131, the email/calendar record store 141, the other record store(s) 151, and/or the like.

The conference call manager 123 can be or may include any hardware coupled with software that can manage/establish a conference call. The conference call can be in one or more medias, such as voice, video, multimedia, IM, virtual reality (e.g., a gaming session), and/or the like. The conference manager 123 may comprise a mixer for mixing audio, video, and/or virtual reality in a communication session. The conference call manager 123 may establish a conference call between two or more users.

The voicemail system 124 can be or may include any hardware coupled with software that allows a person to leave and retrieve a voicemail. In one embodiment, the voicemail system 124 may also support video mails.

The web server 125 can be or may include any web server that can provide web pages to the communication devices 101A-101N. The web server 125 may provide the person identification application 105 that is displayed in a browser (not shown) in the communication endpoint 101.

The social media network(s) 130 can be or may include any kind of social media network, such as Facebook®, Twitter®, Myspace®, LinkedIn®, and/or the like. The social media network(s) 130 further comprise a social media record store 131. The social media record store 131 may include various types of information, such as, text of a post on the social media network 130, a number of posts by a person on the social media network 130, a date of a post on the social media network 130, a time of a post on the social media network 130, a number of followers of the person on the social media network 130, a subject of a post on the social media network 130, a length of a post on the social media network 130, an organization of the person who posted on the social media network 130, a document posted on the social media network 130 (e.g., a video), a time/date of posting of the document, and/or the like.

The email/calendar system 140 can be or may include one or more email/calendar systems 140, such as Outlook®, Gmail®, and/or the like. The email/calendar system 140 further comprises an email/calendar record store 141. The email/calendar record store 141 can be or may include various records associated with an email/calendar, such as, content of an email, an email sender field, an email recipient field, an email carbon copy field, an email blind copy field, a person's name that is closer to a head of the email recipient field, a latest sender in an email thread, a more active sender in the email thread, a date of the email, a time of the email, an organization of a sender of the email, an organization of a recipient of the email, a number of emails within a time period, a subject of the email, an attachment in the email, a subject of the attachment in the email, a type of the attachment in the email, a time of a calendar event, a date of the calendar event, participants in the calendar event, and/or the like.

The other system(s)/device(s) 150 can be or may include any hardware device/system coupled with software that may have information that is useful in identifying a user, such as a gaming system, a virtual reality system, a contact center, a facial recognition scanner, a trouble ticket system, a text messaging system, a printer, a scanner, a Fax machine, a pager, a smartphone, a web site, a camera, a biometric scanner, and/or the like. The other system(s)/device(s) 150 further comprises another record store 151.

The other record store 151 can be or may include any electronic memory that can store information. The type of information in the other record store, can be or may include information, such as, a participant in a video game, a time of a video game, a date of a video game, a length of the video game, a participant in a virtual reality meeting, a time of a virtual reality meeting, a date of a virtual reality meeting, a length of the virtual reality meeting, a facial recognition of a participant, a submitter of a trouble ticket, a caller to a contact center, a sender of a text message, a recipient of the text message, a subject of the text message, a date a document was printed, a time the document was printed, a date/time of a Faxed document, a time a document was created, a date a document was scanned, a time a document was scanned, a date of a document that identifies an issue (e.g., in a contact center or organization), a time of a document that identifies in issue, a creator of a document that identifies an issue, and/or the like.

Figure 2A:
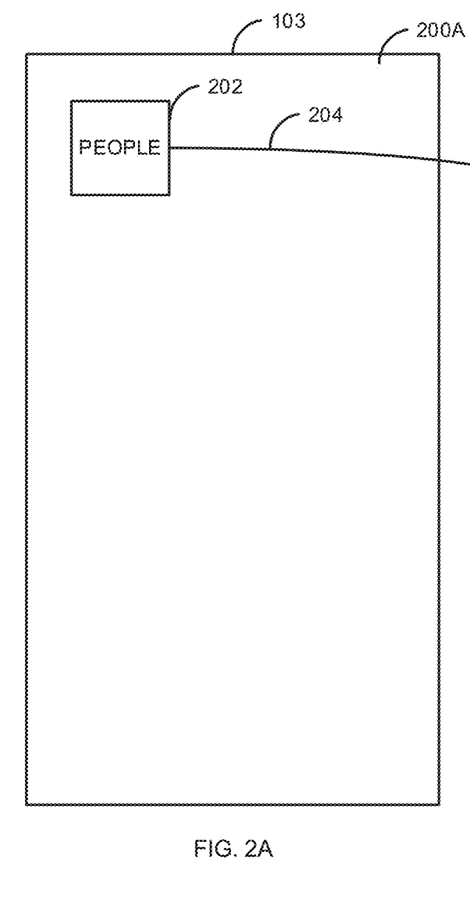
FIGS. 2A-2C are a series of diagrams for selecting a person in order to electronically communicate with a selected person according to the prior art.
Figure 2B:
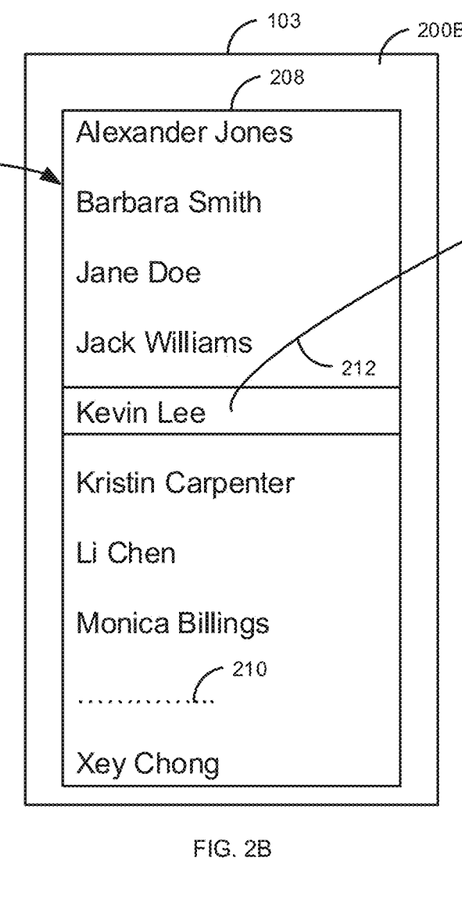
Figure 2C:
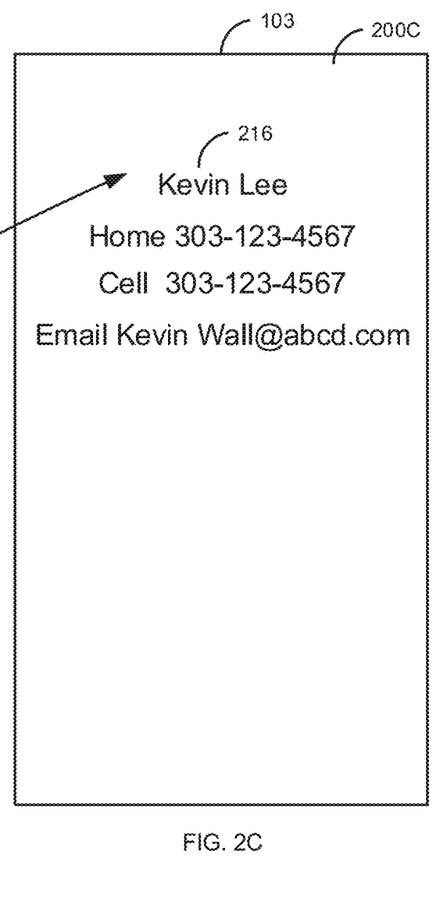

FIGS. 2A-2C are a series of diagrams for selecting a person in order to electronically communicate with a selected person. FIGS. 2A-2C are based on an exemplary embodiment of the prior art. FIGS. 2A-2C comprise user interfaces 200A-200C. The user interfaces 200A-200C are shown in the display 103.

The user interface 200A includes a people application icon 202. Although not shown for convenience, the user interface 200A may comprise icons for other known applications, such as for a browser. When a user selects the people application icon 202, in step 204 (e.g., by touching the people application 202 on a touchscreen), a list of persons 208 is displayed to the user as shown in the user interface 200B. The list of persons 208 is typically a list of contacts the user knows or is associated with in some way. For example, the list of persons may be a corporate directory. As indicated by the " . . . " 210, the list of persons 208 may include any number of persons. As is typical, the list of persons 208 is long and extends beyond what can be displayed in the display 103. For example, if the user is using a hand-held smartphone (the communication device 101), the list of persons 208 cannot be fully displayed to the user in the display 103. As a result, the user will likely to have to scroll through the list of persons 208 in order to find a person who the user is looking for.

Once the user determines the person, the user can select the person. As shown in FIG. 2B, the user has selected the person "Kevin Lee" in step 212. For example, the user has touched a touch screen on the area that displays the name "Kevin Lee." In response to the selection, user interface 200C is displayed to the user in the display 103. The user interface 200C comprises a list of contact options 216 for communicating with the person "Kevin Lee." The user can then select one of the contact options 216 to communicate with "Kevin Lee." For example, the user may select the contact option 216 "Home 303-123-4567" to establish a voice call to the person "Kevin Lee" using Kevin Lee's home telephone number.

As can be seen in FIGS. 2A-2C, even if the user knows the person whom he/she wants to call, multiple screens are necessary to identify the person. In addition, the user may have to scroll through the list of persons 208 (or use other input such as a keyboard). If the user does not know the actual name of the person, this can become very time consuming. For example, the user may have to scroll through hundreds of names. Even this does not guarantee that the user will remember the person's name. For example, the user may only remember a nickname of the person that does not appear in the list of persons 208. As can be seen in FIGS. 2A-2C there is a clear deficiency in the prior art.

Figure 3A:
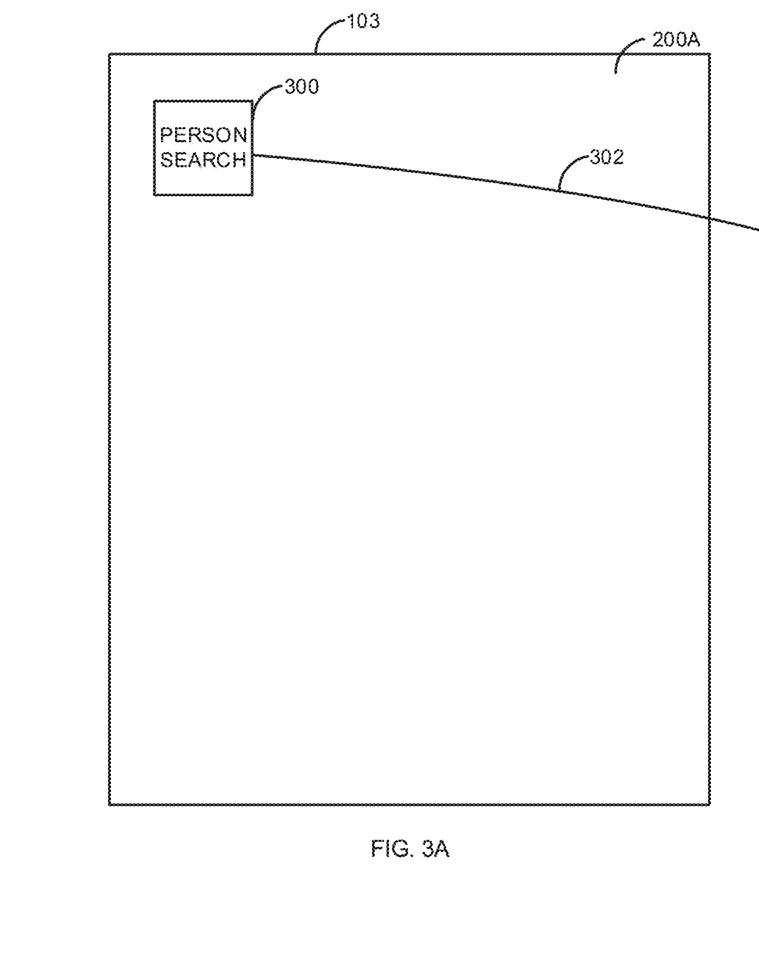
FIGS. 3A-3B are a series of diagrams for initiating a simplified user interface that allows a user to quickly identify a person and to establish a communication session using a simplified user interface.
Figure 3B:
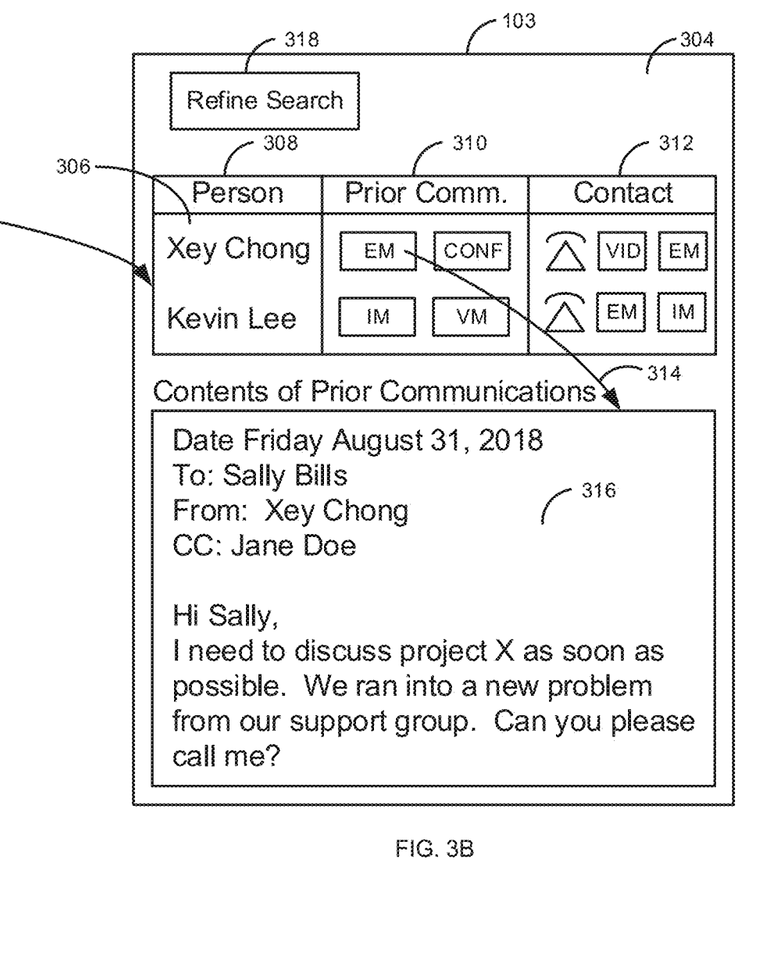

FIGS. 3A-3B are a series of diagrams for initiating a simplified user interface 304 that allows a user to quickly identify a person (e.g., where the person's name has been forgotten) and to establish a communication session using a simplified user interface 304. FIG. 3B overcomes the problems with the prior art. In FIG. 3A, the display 103 shows the user interface 200A. In this example, instead of displaying the people application icon 202, a person search icon 300 is shown (which is not known in the prior art). When the user (Sally Bills in this example) selects the person search icon 300, this launches the person identification application 105. In one embodiment, the user may navigate to a web page provide by the web server 125, which causes the person identification application 105 to be loaded into a browser.

The person identification application 105 asks the user (Sally Bills) to state information that can identify the person who the user (Sally Bills) want to communicate with (e.g., based on a message that is sent from the system person identification application 122 that is converted to voice by the person identification application 105). This is typically accomplished via a voice interface (although other types of input may be envisioned, such as text input). For example, the person identification application 105 may say "Sally, please state information that can help identify the person you are trying to contact." In response, the user (Sally Bills) may say "find the name of the user who sent me an email last Friday and mentioned the Project X." The person identification application 105 and/or system person identification application 122 then parses this information to identify one or more keywords that are used to filter information. For example, "email," "last Friday," and "Project X" are identified as keywords that are used to identify specific electronic record store(s)/device(s) that may contain information about the person that the user is trying to identify. For example, in this case, the keywords allow the person identification application 105 and/or system person identification application 122 to specifically identify a device (the email/calendar system 140) and an electronic record store (the email/calendar record store 141) to search emails sent to the user (Sally Bills) last Friday that mention "Project X."

In one embodiment, information other than text/voice to text may be used. A video, a picture, a voiceprint, a biometric, and/or the like may be used as part of the search criteria. For example, the user may say "give me the name of the person who was in the picture I received from Tom Smith in an email yesterday." In this case, the search may use facial recognition and then search a corporate database of pictures of employees to attempt to identify the person.

In some embodiments, the search may also look at additional electronic record stores (e.g., the communication record store 121/other record store 151) to identify additional records that may match. The search may be conducted based on keywords separately. For example, based on the keyword "Project X," the communication record store 121/other record store 151 may also searched. The extended search may allow the user to more easily identify who he/she wants to communicate with. The search may be based on various rules that are defined by the user, predefined, and/or learned (e.g., using Artificial Intelligence (AI)).

The results of the search causes the simplified user interface 304 to be displayed in the display 103 to the user of the communication device 101. For example, as shown in FIG. 3B, the persons "Xey Chong" and "Kevin Lee" are displayed in a simplified list of persons 306 based on the search using the keywords. The order (where Xey Chong is first) is based on which person is most likely a match to the request (a defined level of a matching score). The simplified list of persons 306, in this exemplary embodiment, comprises a person column 308, a prior communication column 310, and a contact column 312.

The person column 308 shows the names of the identified persons in the simplified list of persons 306 (Kevin Lee and Xey Chong in this example). The prior communication column 310 contains buttons that the user can select. The buttons represent identified documents that are the most likely related to the search. For example, for Xey Chong, there is an EM (email) button and a CONF (conference call) button. The user (Sally Bills) has selected the EM button in the prior communication column 310 as shown in step 314. This results in the display of the identified email in the document window 316. In this example, the email displayed in the document window 316 matches the filter criteria of an email sent last Friday that discusses Project X. The CONF button in the prior communication column 310 represents a conference call where Project X was discussed and Xey Chong was a participant. The user (Sally Bills) can select the CONF button to get details of the conference call (e.g., a voice to text conversion, date, time, participant roster, etc.).

For Kevin Lee, in the prior communication column 310, there is an IM (Instant Messaging) button and a VM (voicemail) button. The IM button represents an IM session that the user (Sally Bills) had with Kevin Lee. For example, the IM session may be where Sally Bills and Kevin Lee discussed project X. The VM button represents a voicemail left by Kevin Lee where Kevin Lee mentioned Project X.

The contact column 312 for Xey Chong shows a telephone button, a VID (video) button, and an EM (email) button. The user (Sally Bills) can select one of these buttons to establish a communication with the user Xey Chong. For Kevin Lee, the contact column 312 shows a telephone button, an EM (email) button, and an IM (Instant Messaging) button. The user (Sally Bills) can select one of these buttons to establish a communication session with the user Kevin Lee.

If the search does not provide the right person in the person column 308, the user (Sally Bills) can select the refine search button 318 to either refine the search or to do a new search. For example, the user (Sally Bills) may say after selecting the refine search button 318 "find the name of the user who sent me an email last Friday and mentioned the Project X and where Jack Williams was mentioned in the email." This results in a new simplified list of persons 306 that is displayed to the use (Sally Bills).

Figure 4:
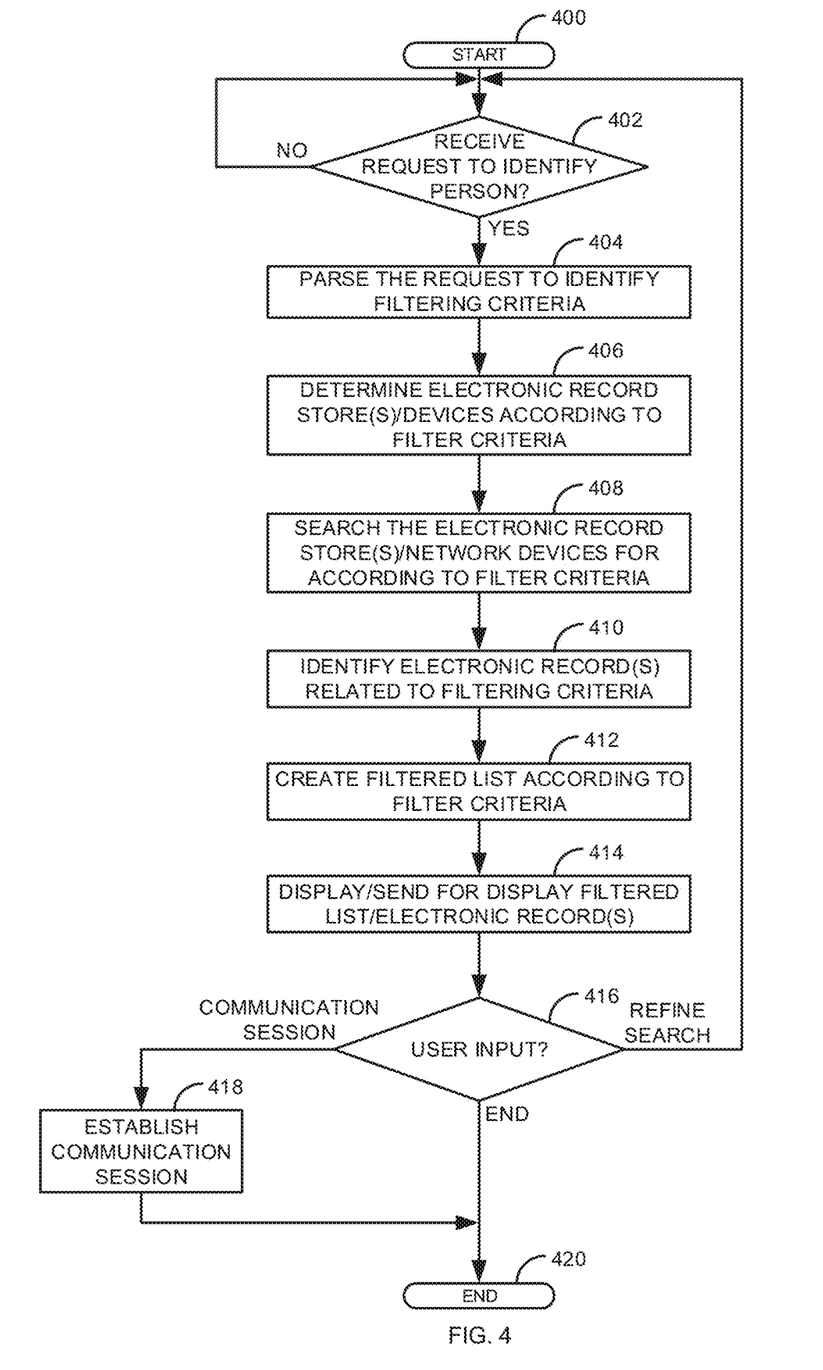
FIG. 4 is a flow diagram of a process for a simplified user interface for identifying people when making electronic communications.
Figure 5:
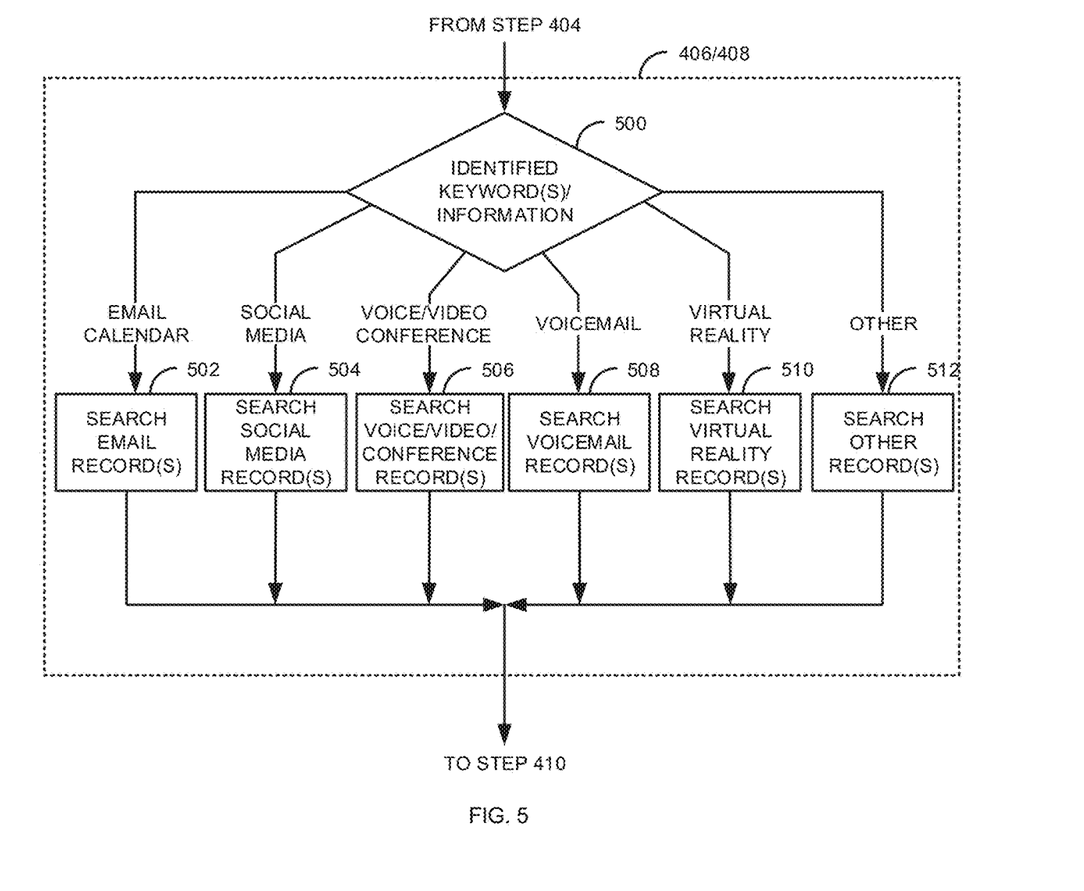
FIG. 5 is a flow diagram of a process for identifying specific communication devices/record stores in order to identify records.

FIG. 4 is a flow diagram of a process for a simplified user interface for identifying people when making electronic communications. Illustratively, the communication devices 101A-101N, the person identification application 105, the communication manager 120, the communication record store 121, the system person identification application 122, the conference call manager 123, the voicemail system 124, the web server 125, the social media network(s) 130, the social media record store 131, the email/calendar system(s) 140, the email/calendar record store 141, the other system(s)/devices 150, and the other record store(s) 151 are stored-program-controlled entities, such as a computer or microprocessor, which performs the method of FIGS. 3-5 and the processes described herein by executing program instructions stored in a computer readable storage medium, such as a memory (i.e., a computer memory, a hard disk, and/or the like). Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 400. The person identification application 105/system person identification application 122 waits in step 402 to receive a request to identify a person. For example, the user selects the person search icon 300 and says "find me the names of the people whom I played World of Warcraft with last week." If a request is not received in step 402, the process of step 402 repeats.

If a request to identify a person is received in step 402, the person identification application 105/system person identification application 122 parses the request to identify filtering criteria in step 404. For example, "played," "World of Warcraft," and "last week" are parsed from the request in step 404.

The person identification application 105/system person identification application 122 determines the electronic record store(s)/devices according to the filter criteria in step 406. For example, a record store that is part of a gaming system (e.g. the other record store 151) may be determined in step 406. In one embodiment, a full text search may be used in step 406. A full text search goes beyond the presence of key words. A full text search ranks documents by relevance. For example, a Term Frequency-Inverse Document Frequency (TF-IDF) search may be used to rank documents in which a search term occurs more frequently and are thus ranked higher over other documents without the search term; however, search terms that occur in all documents are discounted. In other words, a document can be seen as a set of fields containing values. For example, an email has a From, a To, a Subject: a Date, and a Body field. The user's query is turned into search criteria over the various fields. Another option would be to do a full text retrieval. The key point is to treat various record stores 121/131/141/151 as sets of documents, and turn the user's query into a full text search. The determined record store/device are then searched, in step 408, according to the filter criteria.

The person identification application 105/system person identification application 122 identifies one or more electronic records that are based on the filtering criteria (or possibly none if there is not a match) in step 410. For example, the person identification application 105/system person identification application 122 may identify records in the other record store 151 of several gaming events where the user played World of Warcraft last week. The record store also includes a list of participants of the gaming events. Based on the identified electronic records of step 410, the person identification application 105/system person identification application 122 creates a filtered list according to the filtering criteria in step 412 (e.g., the simplified list of persons 306). The simplified list of persons 306 may be created based on record store 121/131/141/151 specific heuristics. For example, if a full text search is performed, based on the identified set of documents, the simplified list of persons 306 can be identified based on relevance scores from the full text search/heuristics. Examples of heuristics for ordering names in the simplified list of people 306 may include: people at the head of an e-mail's To field is ranked ahead of those at the end of the To: field, people who are more active in an e-mail thread are ranked ahead of lurkers, a game might have a winner, and/or the like. Heuristics can order names derived from a single document or a thread of documents. Relevance scores are used to combine these ordered fragments. For example, suppose two e-mails were identified by the search. E-mail #1 has a relevance score of 0.8, from which the names Sender 1 and Recipient 1 were extracted. E-mail #2 has a relevance score of 0.5 and yielded names Recipient 1 and Recipient 2 (the sender is the person doing the search, so the sender is not included). The combined simplified list of persons 306 would be Sender 1, Recipient 1, and Recipient 2 based on the relevance scores.

The filtered list and/or electronic records are sent/displayed in step 414. For example, as shown in FIG. 3B in the simplified list of persons 306 (in the person column 308/ prior communication column 310).

The person identification application 105/system person identification application 122 determines if there is user input in step 416. If the user wants to initiate a communication session with a selected person (e.g., by selecting one of the buttons in the contact column 312), the communication session is established (or attempted to be established) in step 418 and the process ends in step 420. For example, a voice communication session can be established (e.g., using SIP) in step 418. If the user input is to end the process (e.g., by closing the simplified user interface 304) the process ends in step 420. Otherwise, if the user wants to refine the search (e.g., by selecting the refine search button 318) the process goes back to step 402 to receive a new request to identify a person.

FIG. 5 is a flow diagram of a process for identifying specific network devices/record stores in order to identify records. FIG. 5 is an exemplary embodiment of steps 406/408 of FIG. 4. After parsing the request to identify the filtering criteria in step 402, the person identification application 105/system person identification application 122 uses the identified keywords/information of step 402 to determine which record stores/devices to search in step 500. As shown in FIG. 5, there are six different record stores/devices that may be searched. As one of skill in the art would recognize, additional record stores/devices may be searched based on the identified keywords/information. If multiple record stores/devices are identified in step 500, the search may occur on multiple record stores/devices (e.g., in parallel and/or in serial).

If the identified keyword(s)/information of step 500 identifies an email/calendar event, the email/calendar record store 141 is searched in step 502 and the process goes to step 410. If the identified keyword(s)/information of step 500 is for a social media event, the social media record store 131 is searched in step 504 and the process goes to step 410. If the identified keyword(s)/information of step 500 is for a voice/video conference the communication record store 131 is searched in step 506 and the process goes to step 410. If the identified keyword(s)/information of step 500 is for a voicemail, the communication record store 121 is searched in step 508 and the process goes to step 410. If the identified keyword(s)/information of step 500 is for a virtual reality event (e.g., a virtual reality communication session with a contact center), the other record store(s) 151 are searched in step 510 and the process goes to step 410. If the identified keyword(s)/information of step 500 is requires another type of search (e.g., a trouble ticket database), the other record store(s) 151 are searched in step 512 and the process goes to step 410.

The processes of FIGS. 3-5 discuss where the person identification application 105 works in conjunction with the system identification application 122. However, in one embodiment the person identification application 105 can perform all the functions described in FIGS. 3-5. In this embodiment, the communication endpoint 101 can have its own communication record store 121 that can include any communications made from/to the communication device 101 (e.g., voice, video, email, text, gaming, virtual reality, etc.).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
one or more processors; and
a computer readable medium coupled with the processor and comprising processor readable and executable instructions that program the one or more processors to:
receive a request from a user to identify a person;
parse the request to identify one or more filtering criteria;
based on the one or more filtering criteria, determine one or more electronic record stores to search;
create a filtered list of two or more contacts by searching the one or more electronic record stores using the one or more filtering criteria, wherein the filtered list comprises a prior communication column and a contact column for each of the two or more contacts, wherein the prior communication column comprises a plurality of graphical user interface elements, wherein each graphical user interface element is associated with a prior communication between one of the two or more contacts and the user; and
transmit the filtered list of two or more contacts to a first communication device, wherein one of the two or more contacts is associated with the person.

2. The system of claim 1, wherein the processor readable and executable instructions further program the one or more processors to:
send one or more electronic records associated with the two or more contacts for display on the first communication device using the user interface;
receive, via the first communication device, a selection of one of the one or more electronic records; and
send, to the first communication device, data associated with the selected one of the one or more electronic records for display via the user interface.

3. The system of claim 2, wherein the data associated with the selected one of the one or more electronic records comprises text of an email.

4. The system of claim 1, wherein the one or more filtering criteria comprise filtering criteria of an email and/or calendar application and wherein the filtering criteria of the email and/or calendar application create the filtered list based one or more of: a position of a contact name in relation to a head of an email recipient field, a latest sender in an email thread, a more active sender in the email thread, a date of the email, a time of an email, an organization of a sender of the email, an organization of a recipient of the email, a number of emails within a time period, an attachment in the email, a subject of the attachment in the email, a type of the attachment in the email, a time of a calendar event, a date of the calendar event, and participants in the calendar event.

5. The system of claim 1, wherein the one or more filtering criteria comprise filtering criteria for a conference call and wherein the filtering criteria for the conference call create the filtered list based on one or more of: a roster of participants in the conference call, a Radio Frequency Identifier (RFID) of participants in a conference room that was part of the conference call, a more active talker in the conference call, a less active talker in the conference call, a date of the conference call, a time of the conference call, and a location of a participant in the conference call.

6. The system of claim 1, wherein the one or more filtering criteria comprise filtering criteria for a voicemail message and wherein the filtering criteria for the voicemail message create the filtered list based on one or more of:
a date of the voicemail message, a time of the voicemail message, a subject of the voicemail message, an organization of a person who left the voicemail message, and a location of the person who left the voicemail message.

7. The system of claim 1, wherein the one or more filtering criteria comprise filtering criteria for a social media network and wherein the filtering criteria for the social media network create the filtered list based on one or more of: a number of posts by a person on the social media network, a date of a post on the social media network, a time of the post on the social media network, a number of followers of the person on the social media network, a length of the post on the social media network, an organization of the person on the social media network, a document posted on the social media network, a time of posting of the document, and a date of posting of the document.

8. The system of claim 1, wherein the one or more filtering criteria are based on one or more of: a participant in a video game, a time of the video game, a date of the video game, a length of the video game, a participant in a virtual reality meeting, a time of the virtual reality meeting, a date of the virtual reality meeting, a length of the virtual reality meeting, a facial recognition of the participant in the virtual reality meeting, a submitter of a trouble ticket, a caller to a contact center, a date a document was printed, a time the document was printed, a time the document was created, a date the document was scanned, a time the document was scanned, a date of a faxed document, a time of the faxed document, and an issue in a tracking system.

9. The system of claim 1, wherein the processor readable and executable instructions further program the one or more processors to:
   receive a second request to identify the person;
   refine the one or more filtering criteria by parsing the second request;
   determine one or more refined electronic record stores to search, wherein the one or more refined electronic record stores are determined based on the refined one or more filtering criteria;
   search the one or more refined electronic record stores using the refined one or more filtering criteria to create a second filtered list of contacts; and
   send the second filtered list of contacts to the first communication device.

10. The system of claim 1, wherein the plurality of graphical user interface elements represent documents related to the request.

11. A method comprising:
   receiving, by one or more processors, a request from a user to identify a person;
   parsing, by the one or more processors, the request to identify one or more filtering criteria;
   based on the one or more filtering criteria, determining, by the one or more processors, one or more electronic record stores to search;
   creating, by the one or more processors, a filtered list of two or more contacts by searching the one or more electronic record stores using the one or more filtering criteria, wherein the filtered list comprises a prior communication column and a contact column for each of the two or more contacts, wherein the prior communication column comprises a plurality of graphical user interface elements, wherein each graphical user interface element is associated with a prior communication between one of the two or more contacts and the user; and
   transmitting, by the one or more processors, the filtered list of two or more contacts to a first communication device, wherein one of the two or more contacts is associated with the person.

12. The method of claim 11, further comprising:
   sending, by the one or more processors, one or more electronic records associated with the two or more persons for display on the first communication device using the user interface;
   receiving, by the one or more processors, a selection of one of the one or more electronic records from the first communication device; and
   sending, by the one or more processors, data associated with the selected one of the one or more electronic records to the first communication device for display via the user interface.

13. The method of claim 11, wherein the one or more filtering criteria comprise filtering criteria of an email and/or calendar application and wherein the filtering criteria of the email and/or calendar application create the filtered list based on one or more of: a position of a contact's name in relation to a head of an email recipient field, a latest sender in an email thread, a more active sender in the email thread, a date of the email, a time of an email, an organization of a sender of the email, an organization of a recipient of the email, a number of emails within a time period, an attachment in the email, a subject of the attachment in the email, a type of the attachment in the email, a time of a calendar event, a date of the calendar event, and participants in the calendar event.

14. The method of claim 11, wherein the one or more filtering criteria comprise filtering criteria for a conference call and wherein the filtering criteria for the conference call create the filtered list based on one or more of: a roster of participants in the conference call, a Radio Frequency Identifier (RFID) of participants in a conference room that was part of the conference call, a more active talker in the conference call, a less active talker in the conference call, a date of the conference call, a time of the conference call, and a location of a participant in the conference call.

15. The method of claim 11, wherein the one or more filtering criteria comprise filtering criteria for a voicemail message and wherein the filtering criteria for the voicemail message create the filtered list based on one or more of:
   a date of the voicemail message, a time of the voicemail message, a subject of the voicemail message, an organization of a person who left the voicemail message, and a location of the person who left the voicemail message.

16. The method of claim 11, wherein the one or more filtering criteria comprise filtering criteria for a social media network and wherein the filtering criteria for the social media network create the filtered list based on one or more of: a number of posts by a person on the social media network, a date of a post on the social media network, a time of the post on the social media network, a number of followers of the person on the social media network, a length of the post on the social media network, an organization of the person on the social media network, a document posted on the social media network, a time of posting of the document, and a date of posting of the document.

17. The method of claim 11, wherein the one or more filtering criteria are based on one or more of: a participant in a video game, a time of the video game, a date of the video game, a length of the video game, a participant in a virtual reality meeting, a time of the virtual reality meeting, a date of the virtual reality meeting, a length of the virtual reality meeting, a facial recognition of the participant in the virtual reality meeting, a submitter of a trouble ticket, a caller to a contact center, a date a document was printed, a time the document was printed, a time the document was created, a date the document was scanned, a time the document was scanned, a date of a faxed document, a time of the faxed document, and an issue in a tracking system.

18. The method of claim 11, further comprising:
receiving, by the one or more processors, a second request to identify the person;
refining, by the one or more processors, the one or more filtering criteria by parsing the second request;
determining, by the one or more processors, one or more refined electronic record stores to search, wherein the one or more refined electronic record stores are determined based on the refined one or more filtering criteria;
searching, by the one or more processors, the one or more refined electronic record stores using the refined one or more filtering criteria to create a second filtered list of contacts; and
sending, by the one or more processors, the second filtered list of contacts to the first communication device.

19. The method of claim 11, wherein the plurality of graphical user interface elements represent documents related to the request.

20. A computer device comprising:
one or more processors; and
a computer readable medium coupled with the one or more processors and comprising processor readable and executable instructions that program the one or more processors to:
receive a request from a user to identify a person;
parse the request to identify one or more filtering criteria;
based on the one or more filtering criteria, determine one or more electronic record stores to search;
create a filtered list of two or more contacts by searching the one or more electronic record stores using the one or more filtering criteria, wherein the filtered list comprises a prior communication column and a contact column for each of the two or more contacts, wherein the prior communication column comprises a plurality of graphical user interface elements, wherein each graphical user interface element is associated with a prior communication between one of the two or more contacts and the user; and
transmit the filtered list of two or more contacts to a first communication device, wherein one of the two or more contacts is associated with the person.

* * * * *